Feb. 26, 1957  M. S. CORR  2,782,950
COLLAPSIBLE BREAD BOX
Filed April 12, 1954
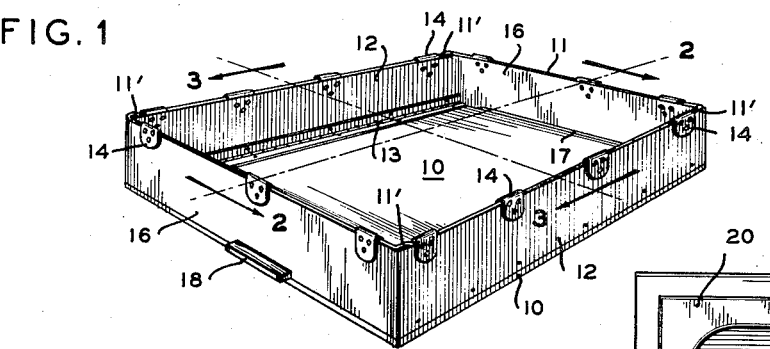
FIG. 1
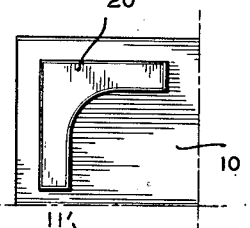
FIG. 6
FIG. 2
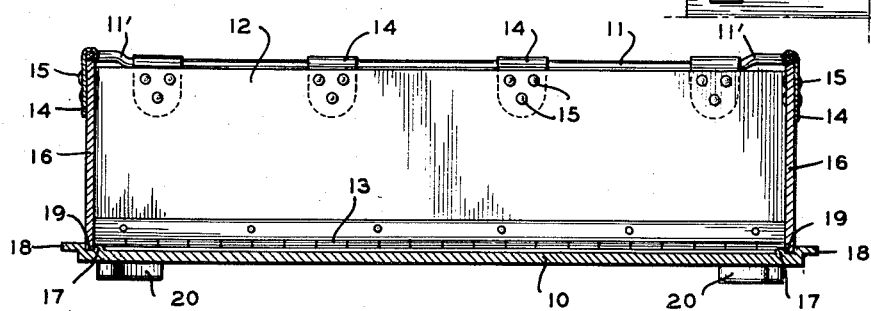
FIG. 3
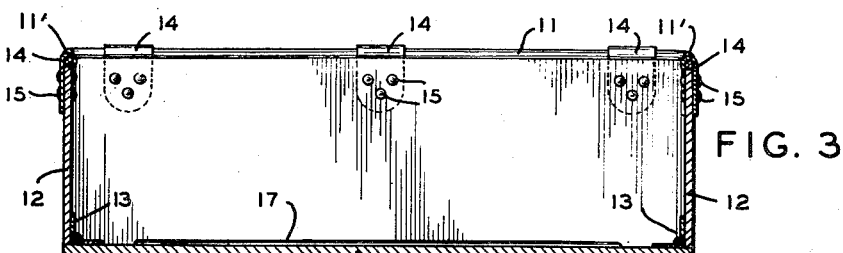
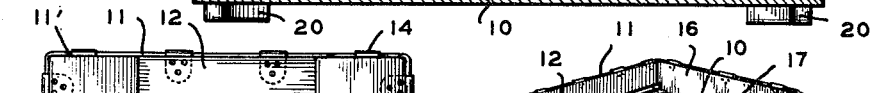
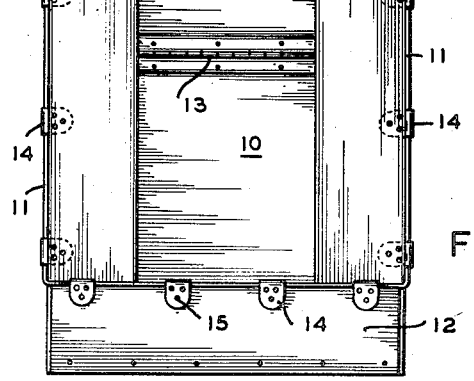
FIG. 4
FIG. 5
INVENTOR
M. S. CORR
BY *A. Yates Dowell*
ATTORNEY United States Patent Office 2,782,950
Patented Feb. 26, 1957

2,782,950

COLLAPSIBLE BREAD BOX

Mark Stroud Corr, Selma, Ala.

Application April 12, 1954, Serial No. 422,560

2 Claims. (Cl. 217—15)

This invention relates to containers for the handling and transportation of bread and other articles and more particularly to a bread tray for use in the handling and transportation of bread which tray can be stacked and when empty will occupy minimum space.

In the handling of bread in bakeries and on vehicles in the delivery of the bread a considerable problem is presented by the empty containers and accordingly, numerous efforts have been made to provide satisfactory bread boxes, trays, or containers which can be satisfactorily handled with minimum space required. These include trays, some of which can be stacked, others collapsed, etc. However, prior devices have not been satisfactory for various reasons, including their cost, complexity, etc.

It is an object of the invention to provide a simple and inexpensive bread tray composed of few parts, which can be easily manufactured and assembled, which facilitates the handling of bread in the bakery and in delivery, which can be readily stacked either in assembled or knocked-down condition.

Further objects and advantages of the invention will be apparent from the following description taken in conjunction with the accompanying drawings, wherein:

Fig. 1 is a perspective view of a tray, illustrating one application of the invention;

Fig. 2, a section on the line 2—2 of Fig. 1;

Fig. 3, a section on the line 3—3 of Fig. 1;

Fig. 4, a perspective of three trays in stacked relation;

Fig. 5, a top plan view of one of the trays in flat or collapsed condition; and

Fig. 6, a bottom plan view of a corner of the tray revealing the configuration and location of the leg.

Briefly stated, the invention comprises a relatively flat substantially rectangular base or bottom member, a wire top member of similar rectangular shape, a pair of side members hinged at each side to the bottom member and having at their upper edges clips snugly embracing wire member, and with end members hinged to the wire member and releasably disposed in upright position between abutments on the bottom member so that with the side and end members in such upright position, substantially at right angles to the base member the tray may be collapsed by moving the end members toward each other over their retaining abutments whereupon the wire top member may be swung so that the sides move on their hinges from an upright position to a substantially horizontal position approximating a position parallel to the base or bottom member.

With continued reference to the drawings, the bread tray of the present invention comprises a relatively thin flat substantially rectangular bottom or base 10, and a wire top member 11 of similar rectangular shape. A pair of side members 12 are attached to the base or bottom by means of piano or strip hinges 13. Clips 14 are secured along the upper portion of these side members by means of rivets or other fasteners 15, and these clips pivotally engaging the wire top member so that the sides may pivot along their lower and upper edges in a manner to swing from an upright position to a substantially horizontal position.

A pair of end members 16 have a series of similar clips 14 attached thereto along their upper edges in a manner to pivotally connect their ends to the wire frame member 11. On account of this construction the end members may swing about the ends of the wire frame member and to limit this swinging a pair of elongated abutments are provided on the base or bottom 10, the inner abutment being in the form of a rib 17, extending for a substantial distance across the base or bottom 10 and limiting inwardly swinging motion and the outer abutment being in the form of a handle 18, the inner edge of which forms a shoulder 19 against which the end 16 is adapted to engage and be limited in its outward movement.

Thus, when the parts are in the position shown in the first four figures of the drawing, the sides 12 and the ends 16 of the tray will be in upright position at right angles to the bottom or base and will be held in such position on account of the sides being secured to both the bottom and the wire frame and with the end members having square extremities disposed between such sides and so held by the lower edges of the ends being retained between the ribs 17 and the shoulders 19.

In the assembled position just described, the tray is adapted for use in the handling of bread in the bakery and in vehicles for transporting the same. Also, if desired, such trays may be stacked as shown in Fig. 4 either when filled, when partly filled or when empty. The trays when empty may be collapsed as shown in Fig. 5 by pressing the lower portions of the ends 16 of the tray inwardly until such ends are swung on the wire top frame which constitutes their pivotal mounting, to substantially horizontal position whereupon endwise movement of these end members will cause the side members to swing in the same direction from an upright to a substantially horizontal position approximating a position parallel to the base or bottom.

The trays may be stacked and in order to maintain them in a definite position in such stacked assembled relation, legs 20 may be attached in any desired manner adjacent each corner of the base but spaced inwardly from the corner so that the four legs 20 may fit within the side and end walls of the next lower tray.

The continuous wire top member 11 is provided with offset portions 11' at the end of each side portion 12 so that when the trays are stacked the weight will be carried by the ends and not by the side hinges. Also, in view of the fact that the handle 18 is integral with the bottom member 10, the wire top member will not be subjected to a strain when handling.

It will be apparent from the foregoing that the present invention includes a tray which is simple to manufacture, which consists of a base or bottom having handles at each ends, and four legs beneath the same, a rib on its upper surface adjacent each handle, a wire top frame, side and end members totaling four, and hinge forming members, connecting the bottom and frame members to the side and end members so that the resulting structure facilitates its use for the purpose intended.

It will be obvious to those skilled in the art that various changes may be made in the invention without departing from the spirit and scope thereof and therefore the invention is not limited by that which is shown in the drawings nor by that which is described in the specification but only as indicated in the appended claims.

What is claimed is:

1. A collapsible breadbox comprising a substantially rectangular bottom having a fixed handle projecting outwardly from each end of the bottom and fixed thereto, said handle having a portion in a plane slightly above the upper surface of the bottom serving as a stop, a side wall pivotally mounted on each side edge of the bottom throughout a major portion of the length thereof for swinging movement from a vertical position relative to the bottom to a position substantially parallel with the bottom, a rectangular wire frame positioned on the top edges of the side walls and being of a size corresponding to the outline of the bottom, said rectangular frame having opposed side portions and opposed end portions, the upper edges of said side walls being pivotally connected to said side portions of the frame, the said wire frame having its end portions located in a plane above the plane of the side portions of said wire frame, a pair of opposed end walls, each end wall pivotally mounted by its upper edge to the corresponding end portion of said wire frame, said end walls being of a length to extend between the side walls and being of a height to be supportingly engaged with the bottom thereby providing a rigid open top breadbox in which the ends are of greater height than the sides for supporting a plurality of open boxes in stacked relation, said bottom having means to engage the inner surface of said end walls to prevent unintentional inward swinging of said end walls, said handles on the ends of said bottom providing for manipualtion of each breadbox or stack of boxes without reducing the stability thereof.

2. The invention according to claim 1, in which downwardly projecting legs are mounted on the under surface of the bottom on each corner of a length greater than the spacing of the planes containing the side portions and end portions of the wire frame and within the outline of the wire frame whereby there is no possibility of lateral displacement of bread boxes arranged in stacked relation.

References Cited in the file of this patent

UNITED STATES PATENTS

| | | |
|---|---|---|
| 864,761 | Erickson | Aug. 27, 1907 |
| 1,283,351 | Stone | Oct. 29, 1918 |
| 1,471,508 | Spangler | Oct. 23, 1923 |
| 1,769,019 | Flagstad | July 1, 1930 |
| 2,114,737 | Gray | Apr. 19, 1938 |
| 2,512,522 | Denny | June 20, 1950 |
| 2,695,115 | Roop | Nov. 23, 1954 |

FOREIGN PATENTS

| | | |
|---|---|---|
| 659,589 | Great Britain | Oct. 24, 1951 |